(12) United States Patent
Chiba

(10) Patent No.: US 9,287,791 B2
(45) Date of Patent: Mar. 15, 2016

(54) SWITCHING POWER-SUPPLY DEVICE HAVING CONTROL CIRCUIT CONTROLLING SWITCHING ELEMENT TO TURN ON-AND-OFF

(71) Applicant: Sanken Electric Co., LTD., Niiza-shi, Saitama (JP)

(72) Inventor: Akiteru Chiba, Saitama (JP)

(73) Assignee: Sanken Electric Co., LTD., Niiza-shi, Saitama (JP)

( * ) Notice: Subject to any disclaimer, the term of this patent is extended or adjusted under 35 U.S.C. 154(b) by 0 days.

(21) Appl. No.: 14/031,343

(22) Filed: Sep. 19, 2013

(65) Prior Publication Data

US 2014/0376271 A1 Dec. 25, 2014

(30) Foreign Application Priority Data

Jun. 25, 2013 (JP) .................................. 2013-132801

(51) Int. Cl.
*H02M 3/335* (2006.01)
*H02M 1/00* (2007.01)

(52) U.S. Cl.
CPC .......... *H02M 3/33569* (2013.01); *H02M 3/335* (2013.01); *H02M 3/33523* (2013.01); *H02M 2001/0058* (2013.01)

(58) Field of Classification Search
CPC ............ H02M 3/335; H02M 3/33507; H02M 3/33515; H02M 3/33523

USPC .......... 363/21.04–21.11, 21.12–21.18, 21.02, 363/21.03, 21.04–21.18
See application file for complete search history.

(56) References Cited

U.S. PATENT DOCUMENTS

| | | | | |
|---|---|---|---|---|
| 4,559,590 A | * | 12/1985 | Davidson | 363/21.02 |
| 6,462,962 B1 | | 10/2002 | Cuk | |
| 2007/0236966 A1 | * | 10/2007 | Uruno et al. | 363/20 |
| 2009/0251938 A1 | * | 10/2009 | Hallak | 363/132 |
| 2009/0262557 A1 | * | 10/2009 | Asuke et al. | 363/18 |
| 2012/0063174 A1 | * | 3/2012 | Kuwabara et al. | 363/21.02 |

FOREIGN PATENT DOCUMENTS

JP 3665054 B2 6/2005

\* cited by examiner

*Primary Examiner* — Jeffrey Gblende
(74) *Attorney, Agent, or Firm* — Banner & Witcoff, Ltd.

(57) ABSTRACT

A switching power-supply device, includes a first terminal; a first winding connected to the first terminal; a second winding, which is connected in series to the first winding and is magnetically coupled to the first winding; a first capacitor connected in series to the second winding; a transformer including a primary winding connected in series to the first capacitor and a secondary winding magnetically coupled to the primary winding; a rectifying-and-smoothing circuit connected to the secondary winding; a second terminal, which is connected to an opposite end of the primary winding opposite to a connection end connecting to the first capacitor; a first switching element, which is connected between a connection point of the first winding and the second winding and the second terminal; and a control circuit, which controls first switching element to turn on-and-off.

3 Claims, 4 Drawing Sheets

SWITCHING POWER-SUPPLY DEVICE HAVING CONTROL CIRCUIT CONTROLLING SWITCHING ELEMENT TO TURN ON-AND-OFF

CROSS-REFERENCE TO RELATED APPLICATION

This application claims priority from Japanese Patent Application No. 2013-132801 filed on Jun. 25, 2013, the entire subject matter of which is incorporated herein by reference.

TECHNICAL FIELD

This disclosure relates to a switching power-supply device.

BACKGROUND

As a switching power-supply device used in electronic equipment, various kinds of non-isolated or isolated DC-DC converters are known (for example, see JP-B-3665054). The isolated DC-DC converters supply an input voltage to a primary winding of a transformer by a switching element and generate an induced electromotive force in a secondary winding of the transformer to thereby obtain an output voltage.

SUMMARY

In such an isolated DC-DC converter, in a case where an input voltage is a low voltage, since the voltage supplied to the primary winding of the transformer becomes a low voltage and a turn ratio of the transformer is also limited, the switching element switches a current, which is not much different from a non-isolated chopper that directly switches a load current. Therefore, it is impossible to achieve the expected efficiency and noise characteristics.

Further, in the isolated DC-DC converter, in case where an input voltage is a low voltage, since the switching element switches a high current, the leakage inductance caused by the coupling degree of the transformer would limit an output power. To increase the output power, it is necessary to lower the leakage inductance as possible, i.e., to increase the coupling degree thereof. Ultimately, an ideal transformer having a coupling degree 1 is required. Thus, the conventional isolated DC-DC converter is not suitable for a high-power output and a low-voltage input.

In view of the above, this disclosure provides at least a switching power-supply device that is capable of realizing high efficiency and low noise while performing a high-power output and a low-voltage input.

A switching power-supply device of this disclosure comprises: a first terminal configured to connect to one end of a DC power source; a first winding connected to the first terminal; a second winding, which is connected in series to the first winding and is magnetically coupled to the first winding; a first capacitor connected in series to the second winding; a transformer including a primary winding connected in series to the first capacitor and a secondary winding magnetically coupled to the primary winding; a rectifying-and-smoothing circuit connected to the secondary winding; a second terminal, which is configured to connect to the other end of the DC power source and is connected to an opposite end of the primary winding opposite to a connection end connecting to the first capacitor; a first switching element, which is connected between a connection point of the first winding and the second winding and the second terminal; and a control circuit, which controls first switching element to turn on-and-off.

According to this disclosure, it is possible to provide a switching power-supply device capable of realizing high efficiency and low noise while performing a high-power output and a low-voltage input.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Hereinafter, the exemplary embodiments of this disclosure will be described with reference to the accompanying drawings.

Figure 1:
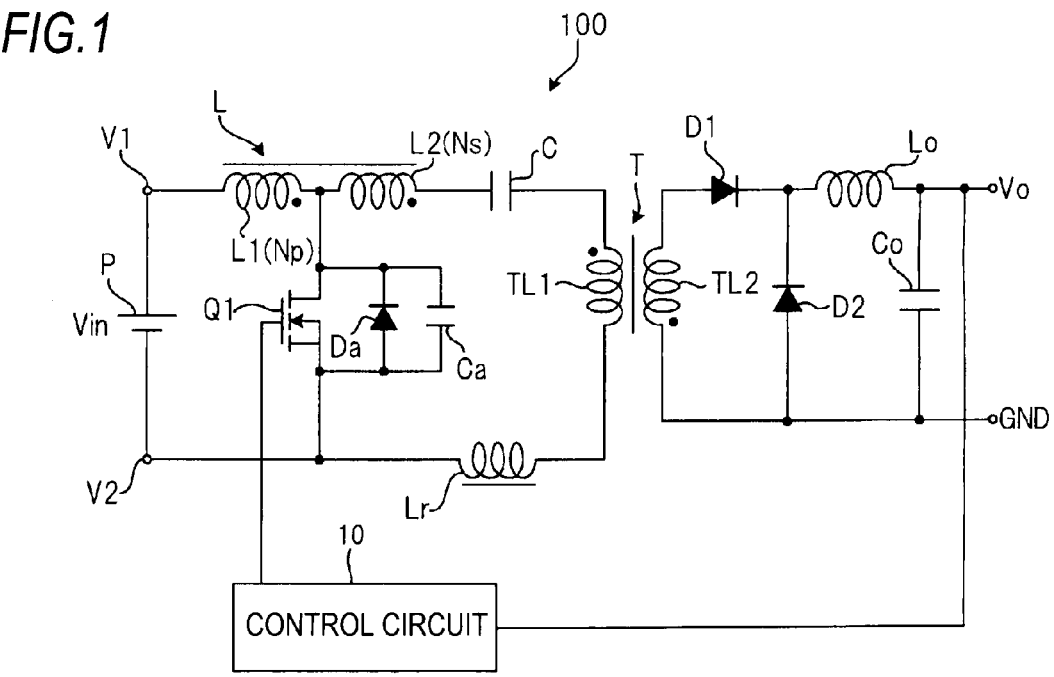
FIG. 1 is a circuit diagram illustrating a schematic configuration of a switching power-supply device 100 according to an exemplary embodiment of this disclosure.

FIG. 1 is a circuit diagram illustrating a schematic configuration of a switching power-supply device 100 according to an exemplary embodiment of this disclosure.

The switching power-supply device 100 includes a terminal V1 (first terminal) connected to one end of a DC power supply P supplying a DC voltage Vin obtained by rectifying-and-smoothing a AC voltage from, for example, a commercial power supply, a terminal V2 (second terminal) connected to the other end (ground terminal) of the DC power supply P, reactors L, Lr and Lo, capacitors C, Ca and Co, a switching element Q1, diodes Da, D1 and D2, a transformer T, a control circuit 10 which is mainly composed of a processor, an output terminal Vo, and a ground terminal GND.

The reactor L includes a first winding L1 (a number of turns Np) which is connected to the terminal V1, and a second winding L2 (a number of turns Ns), which is connected in series with the first winding L1 and is magnetically coupled to the first winding L1. The winding-finish end of the first winding L1 is connected to the terminal V1, and the winding-start end of the first winding L1 is connected to the winding-finish end of the second winding L2.

The switching element Q1 is configured by, for example, a MOSFET. The switching element Q1 is connected between a connection point of the first winding L1 and the second winding L2 of the reactor L and the terminal V2.

The diode Da is connected in parallel to the switching element Q1. The diode Da may be a parasitic diode built into the switching element Q1.

The capacitor Ca is connected in parallel to the switching element Q1. The capacitor Ca may be a parasitic capacitor that is built into the switching element Q1.

The capacitor C is connected in series to the second winding L2 of the reactor L.

The transformer T includes a primary winding TL1 connected in series to the capacitor C, and a secondary winding TL2 which is magnetically coupled to the primary winding TL1. The winding-start end of the primary winding TL1 is connected to the capacitor C, and the winding-finish end of the primary winding TL1 is connected to the terminal V2.

The reactor Lr, which does not exist physically, is shown equivalently as a reactor having leakage inductance component (leakage inductance) from the primary winding TL1. In the example of FIG. 1, the reactor Lr is connected equivalently between the winding-finish end of the primary winding TL1 and the terminal V2. However, it may be connected equivalently between the capacitor C and the winding-start end of the primary winding TL1.

Further, the reactor Lr may be one provided physically separately from the primary winding TL1 of the transformer T.

The winding-start end of the secondary winding TL2 of the transformer T is connected to the ground terminal GND, and the winding-finish end of the secondary winding TL2 is connected to the anode of the diode D1.

The anode of the diode D2 is connected to the ground terminal GND, and the cathode of the diode D2 is connected to the cathode of the diode D1.

The reactor Lo is connected to a connection point of the diodes D1, D2 and an output terminal Vo.

The capacitor Co is connected between a connection point of the reactor Lo and the output terminal Vo and the ground terminal GND. The diodes D1, D2, the reactor Lo, and the capacitor Co configures a rectifying-and-smoothing circuit for rectifying-and-smoothing a voltage generated in the secondary winding TL2.

Therefore, in the switching power-supply device 100, the primary winding TL1 and the secondary winding TL2 are configured so that the direction of the current flowing through the primary winding TL1 is the same as the direction of the current flowing through the secondary winding TL2. Incidentally, a turn ratio of the primary winding TL1 and the secondary winding TL2 is set such that the voltage output from the output terminal Vo is greater than the input voltage.

The control circuit 10 controls the gate voltage of the switching element Q1 and performs on-and-off control of the switching element Q1. The voltage output to the output terminal Vo is fed back to the control circuit 10. Based on the feedback voltage, the control circuit 10 performs on-and-off control so that the output voltage becomes a desired value.

The operation of the switching power-supply device 100 configured as described above will be described.

Immediately before the control circuit 10 turns on the switching element Q1, the voltage of the capacitor C is set as the input voltage Vin supplied from the DC power supply P. In this state, when the control circuit 10 turns on the switching element Q1, the input voltage Vin is supplied to the first winding L1. Thus, the second winding L2 is supplied with a voltage of (Ns/Np) times the input voltage Vin. Accordingly, the primary winding TL1 of the transformer T is magnetized with a voltage of Vin×{1+(Ns/Np)} by the second winding L2 and the capacitor.

According to magnetization, a current corresponding to a turn ratio of the primary winding TL1 and the secondary winding TL2 flows in the secondary winding TL2 of the transformer T. This current is rectified by the diode D1, and the reactor Lo is magnetized by this current. The rectified and smoothed output voltage is obtained from the output terminal Vo.

As described above, according to the switching power-supply device 100, at the turn-on time of the switching element Q1, the voltage supplied to the primary winding TL1 of the transformer T1 can be {1+(Ns/Np)} times the input voltage Vin. For this reason, the high-power output and low-voltage input become possible. Further, since the voltage supplied to the primary winding TL1 is increased, it is possible to increase the turn ratio of the primary winding TL1 and the secondary winding TL2 of the transformer T, so that a current flowing through the primary winding TL1 can be reduced.

Since the current flowing through the primary winding TL1 is reduced and the current switched by the switching element Q1 is reduced, it is possible to achieve high efficiency and low noise. Further, since the current flowing through the primary winding TL1 is reduced, even though the inductance of the reactor Lr is large, the output power will be not limited. That is, since the transformer T is tightly coupled, the high-power output is possible even without increasing the coupling degree (without using an ideal transformer having the coupling degree 1), and at the same time, since the coupling capacity of the transformer T does not become large, it is possible to reduce the common mode noise.

Incidentally, the magnitude of the voltage supplied to the primary winding TL1 at the turn-on time of the switching element Q1 is determined by the ratio (Ns/Np) corresponding to the number of turns Np of the first winding L1 and the number of turns Ns of the second winding L2. There is no particular limitation on the value of (Ns/Np). However, it is preferable to cause Ns to be equal to or greater than Np so that the voltage supplied to the primary winding TL1 can be increased to over twice the input voltage Vin.

In the switching power-supply device used in electronic equipment requiring safety of the human body such as medical instruments or the like, the upper limit of the input voltage Vin is limited to a small value by the safety standard. Therefore, the switching power-supply device 100 of the present exemplary embodiment is suitable for electronic equipment that cannot use a high input voltage.

For example, if attempting to obtain the output voltage of about 5V to 24V based on an input of a SELV (safety extra low voltage), it is preferable to allow the ratio of Ns and Np to be Np:Ns=1:(1 to 4). However, if the value of Ns is too large, since the current back to the input side is also increased correspondingly, it is more preferable to allow the ratio of Np:Ns=1:(2 to 3).

Figure 2:
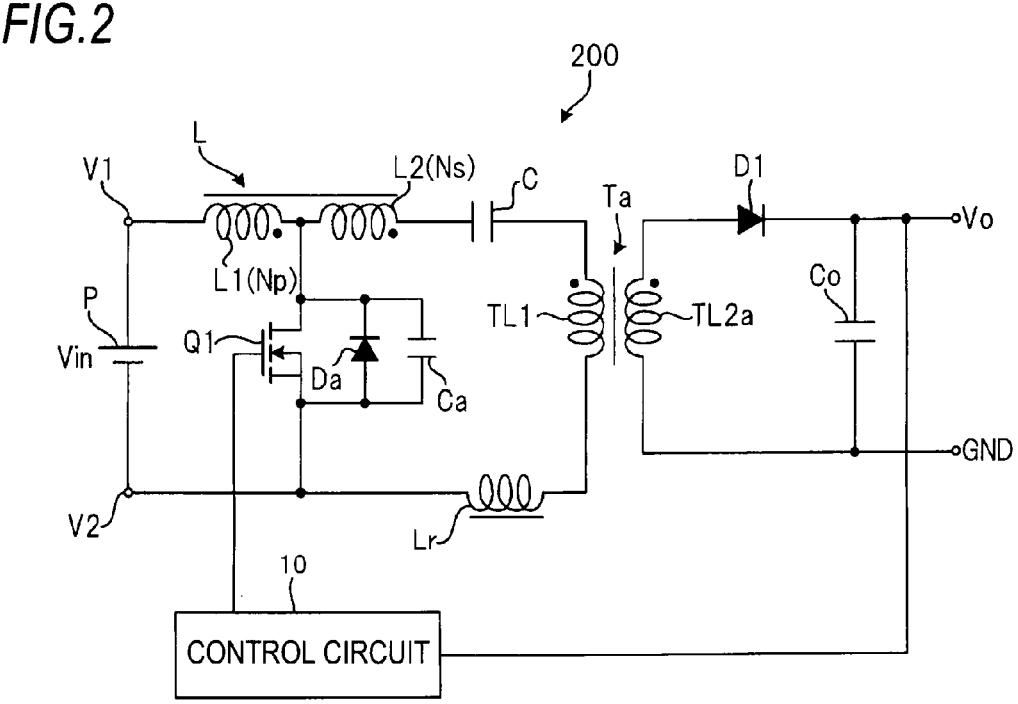
FIG. 2 is a circuit diagram illustrating a schematic configuration of a switching power-supply device 200 according to a modified embodiment of the switching power-supply device 100.

FIG. 2 is a circuit diagram illustrating a schematic configuration of a switching power-supply device 200 according to modified embodiment of the switching power-supply device 100 illustrated in FIG. 1.

The switching power-supply device 200 illustrated in FIG. 2 has the same configuration as that of the switching power-supply device illustrated in FIG. 1, except that the diode D2 and the reactor Lo have been removed, the cathode of the diode D1 is connected to the output terminal Vo, and the transformer T has been changed to the transformer Ta.

The transformer Ta has been made by changing the secondary winding TL2 illustrated in FIG. 1 to a secondary winding TL2a. The number of turns of the secondary winding TL2a is the same as that of the secondary winding TL2. The winding-start end of the secondary winding TL2a is connected to the anode of the diode D1, and the winding-finish end of the secondary winding TL2a is connected to the ground terminal GND.

Therefore, the switching power-supply device 200 is configured so that the direction of the current flowing through the primary winding TL1 and the direction of the current flowing through the secondary winding TL2a are reversed. Meanwhile, in the switching power-supply device 200, the diode D1 and the capacitor Co configure a rectifying-and-smoothing circuit for rectifying-and-smoothing a voltage generated in the secondary winding TL2a of the transformer T.

The switching power-supply device 200 configured as described above operates in the same manner as a so-called isolated SEPIC type converter. That is, when the switching element Q1 is turned on, the voltage of (Ns/Nb) times the input voltage Vin is applied to the primary winding TL1. At this time, no current flows through the diode D1. Then, when the switching element Q1 is turned off, the energy that is magnetized in the transformer Ta is discharged, current flows accordingly through the diode D1 from the secondary winding TL2a, and an output voltage rectified and smoothed is obtained.

The switching power-supply device 200 has the same configuration as the switching power-supply device 100 except for the circuit on the output side thereof. Therefore, similarly to the switching power-supply device 100, the high-power output and the low-voltage input are possible, and further, it is possible to achieve low noise and high efficiency. Further, as compared with the switching power-supply device 100, since the reactor Lo and diode D2 can be removed, it is advantageous to reduce a circuit area and a cost.

Figure 3:
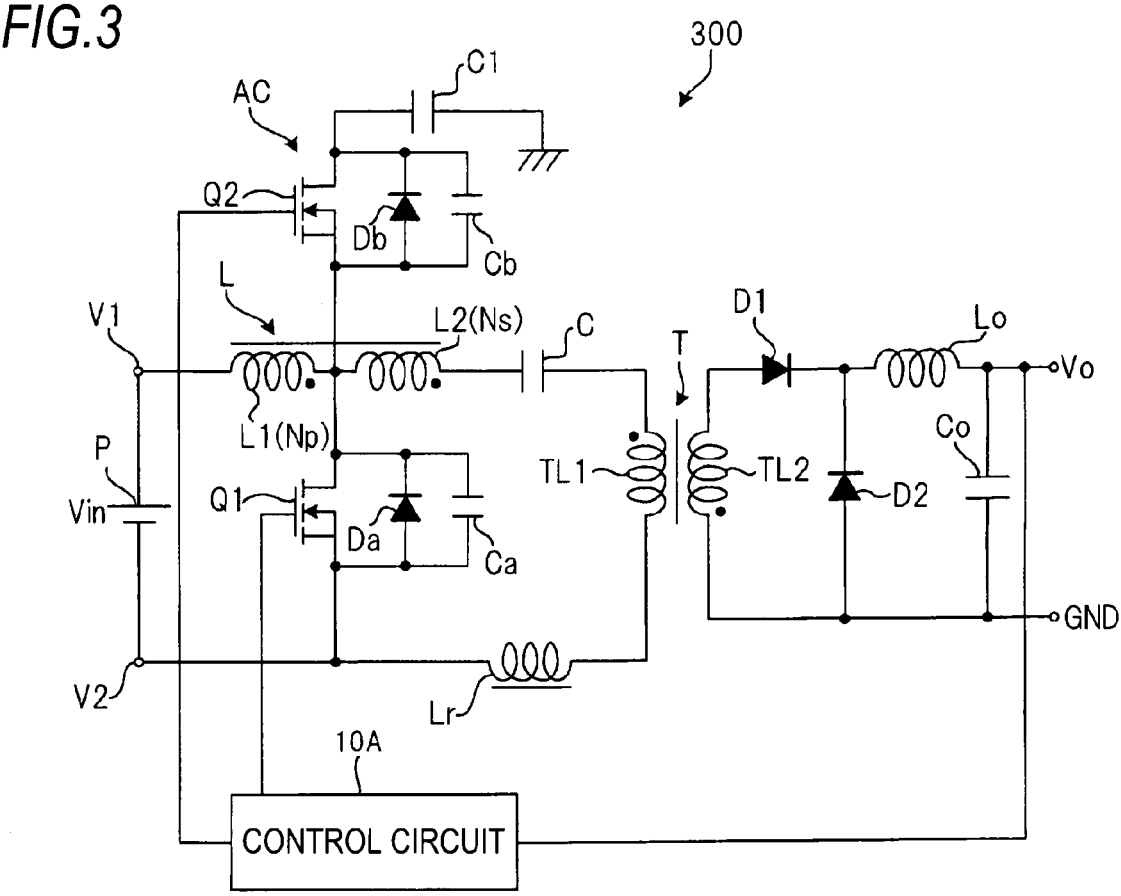
FIG. 3 is a circuit diagram illustrating a schematic configuration of a switching power-supply device 300 according to a modified embodiment of the switching power-supply device 100.

FIG. 3 is a circuit diagram illustrating a schematic configuration of a switching power-supply device 300 according to modified embodiment of the switching power-supply device 100.

The switching power-supply device 300 illustrated in FIG. 3 has the same configuration as the switching power-supply device 100 illustrated in FIG. 1, except that an active clamp circuit AC has been added and the control circuit 10 has been changed to the control circuit 10A a control circuit 10.

The active clamp circuit AC includes a series circuit of a capacitor C1 and a switching element Q2 which is connected in parallel to the switching element Q1, a diode Db which is connected in parallel to the switching element Q2, and a capacitor Cb which is connected in parallel to the switching element Q2.

Incidentally, the diode Db may be a parasitic diode built in the switching element Q2. Further, the capacitor Cb may be a parasitic capacitor built in the switching element Q2.

The switching element Q2 is configured by, for example, a MOSFET. The switching element Q2 has a source terminal connected to a connection point of the first winding L1 and the second winding L2 and a drain terminal connected to one end of the capacitor C1. The other end of the capacitor C1 is connected to the ground.

The control circuit 10A controls the gate voltage of the switching element Q1 and the switching element Q2. The control circuit 10A performs the complementary control, which turns off one of the switching element Q1 and switching element Q2 while the other thereof is turned on. Incidentally, the control circuit 10A controls to have a period (dead time) during which both the switching elements Q1 and Q2 are turned off at the timing of switching on and off the switching elements Q1 and Q2.

During a period (unit time) corresponding to one cycle of control until turning on the switching element Q1 after turning on the switching element Q1 with excluding the dead time, the control circuit 10A varies the ratio of the time of turning on the switching element Q1 and the time of turning on the switching element Q2, thereby controlling the voltage output from the output terminal Vo.

The operation of the switching power-supply device 300 will be described.

Figure 4:
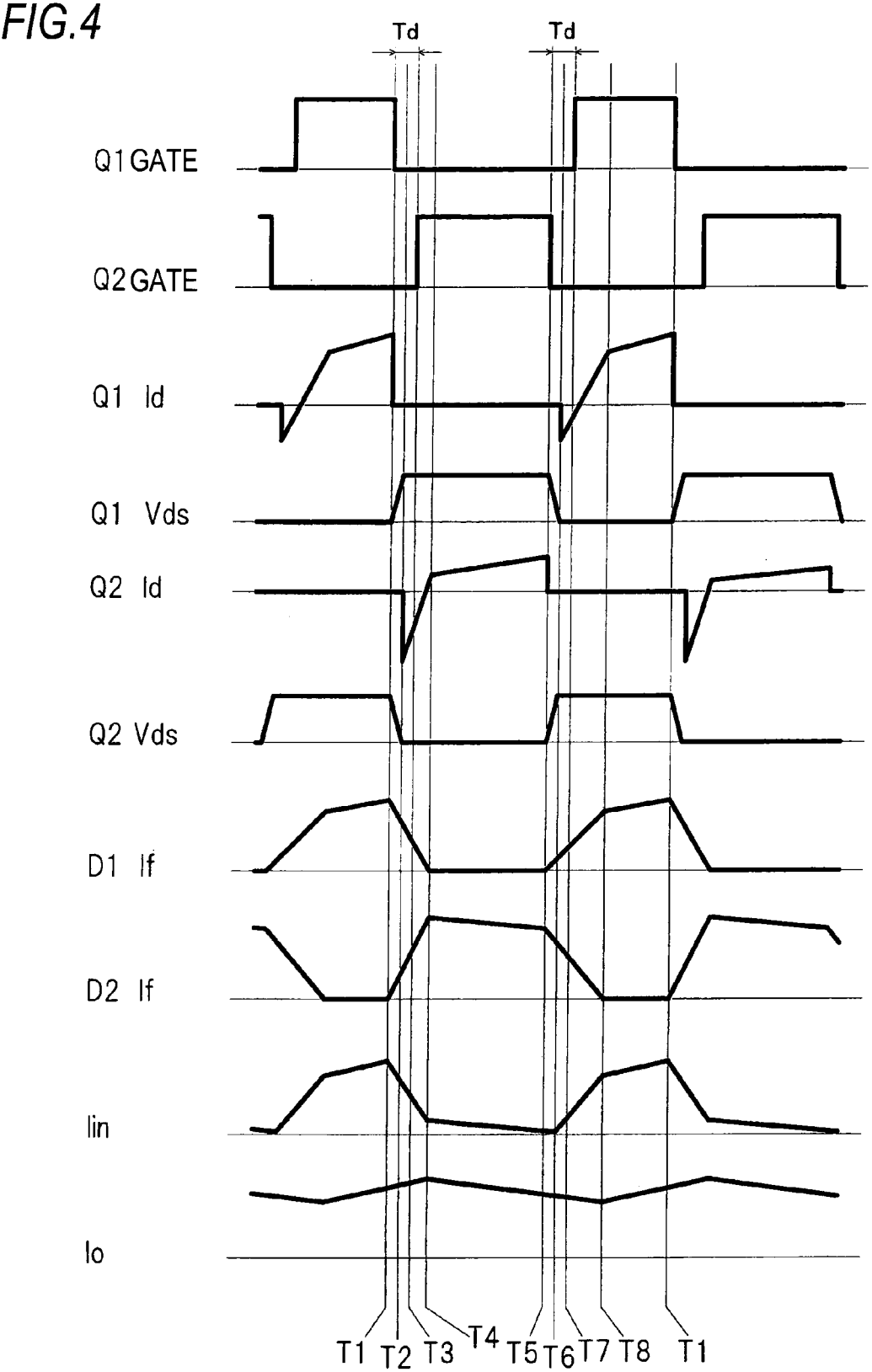
FIG. 4 is a timing chart illustrating an operation of the switching power-supply device illustrated in FIG. 3.

FIG. 4 is a timing chart explaining the operation of the switching power-supply device 300 illustrated in FIG. 3.

Each waveform illustrated in FIG. 3 will be described. A waveform "Q1 GATE" indicates a change in the gate voltage of the switching element Q1. A waveform "Q2 GATE" indicates a change in the gate voltage of the switching element Q2. A waveform "Q1 Id" indicates a variation in the drain current of the switching element Q1. A waveform "Q1 Vds" indicates a change in the drain-source voltage of the switching element Q1. A waveform "Q2 Id" indicates a variation in the drain current of the switching element Q2. A waveform "Q2 Vds" indicates a change in the drain-source voltage of the switching element Q2. "D1 If" indicates a change in the output current of the diode D1. A waveform "D2 If" indicates a change in the output current of the diode D2. A waveform "I in" indicates a variation in the input current supplied from the DC power source P. A waveform "Jo" indicates a change in the current flowing through the output terminal Vo. Meanwhile, "Td" is a dead time. The switching elements Q1 and Q2 are turned on when the gate voltage is at a high level and turned off when it is at a low level.

In the following, the operation after the time T1 when the switching element Q1 is turned off in the state where the switching element Q2 is turned off and the switching element Q1 is turned on will be described. Incidentally, similarly to the switching power-supply device 100 illustrated in FIG. 1, the primary winding TL1 of the transformer T are magnetized at a voltage of Vin×{1+(Ns/Np)}, immediately before the switching element Q1 is turned off.

[Time T1]

When the switching element Q1 is turned off at time T1, the magnetization energy stored in the reactor Lr flows, as a discharge current ILr, through the input side and the active clamp circuit AC. The discharge current ILr passes through the second winding L2. At this time, the current ILr×(Ns/Np) starts to flow in the first winding L1 according to the law of equal ampere-turn. That is, the discharge current ILr is returned to the input side and the input current Iin begins to decrease.

Further, the discharge current ILr is branched at the connection point of the first winding L1 and the second winding L2, and the capacitor C1 and the capacitor Ca starts to be charged by the discharge current. If the capacitor Ca starts to be charged, the voltage Vds between the source and drain of the switching element Q1 increases gradually. Further, when the capacitor C1 is charged, since the charge of the capacitor Cb is discharged, the voltage Vds between the source and drain of the switching element Q2 begins to drop gradually.

Meanwhile, in the turn-on time of the switching element Q1, the current flows in the diode D1 at the output side. However, when the switching element Q1 is turned off at time T1, the discharge current ILr in the reactor Lr passes through the primary winding TL1 of the transformer T. Accordingly, the current flowing through the diode D1 also decreases similarly to the discharge current ILr that decreases with time. Accordingly, the magnetization energy of the reactor Lo that has been magnetized in the turn-on time of the switching element Q1 starts to be discharged, and thereby a current begins to flow gradually into the diode D2.

[Time T2]

After the capacitor Ca continues to be charged by the discharge current ILr and the voltage Vds between the source and drain of the switching element Q1 is fully risen, if the discharge of the capacitor Cb proceeds and the voltage of the capacitor Cb is clamped to −Vfb by the forward voltage Vfb of the diode Db, the discharge current ILr starts to flow through the diode Db.

[Time T3]

While a current is flowing through the diode Db, the switching element Q2 is turned on at time T3, and the switching element Q2 starts to flow the discharge current ILr to the drain terminal from the source terminal. When the release of the discharge energy of the reactor Lr is finished, the voltage (Vc1−Vin) is applied to the first winding L1 of the reactor L by the voltage Vc1, and at the same time, the reactor Lr and the primary winding TL1 of the transformer T start to be magnetized by {(Vc1−Vin)(Ns/Np)+Vc1}. The magnetization loop is formed in the direction in the order of GND, the capacitor C, the switching element Q2, the second winding L2, the capacitor C, the primary winding TL, the reactor Lr, and GND.

[Time T4]

The state at the time T is be maintained, and the reactor Lr and the primary winding TL1 keep on magnetized.

[Time T5]

The switching element Q2 is turned off at time T5, and the discharge current ILr starts to flow from the reactor Lr being magnetized. The path of the discharge current ILr is in the order of the reactor Lr, capacitor Ca, the second winding L2, the capacitor C, the primary winding TL1, the reactor Lr, and the charge in the capacitor Ca starts to be discharged by the discharge current ILr. Further, the switching element Q2 is turned off, so that the capacitor Cb starts to be charged by the voltage Vc1 of the capacitor C1.

Further, the discharge current ILr of the reactor Lr starts to flow, and at the same time, a current starts to flow in the diode D1 through the transformer T. At the same time, the discharge of the discharge energy of the reactor Lo is accelerated, and the current of the diode D2 also decreases according to rising of the current of the diode D1.

[Time T6]

If the capacitor Ca continues to be discharged by the discharge current ILr of the reactor Lr and the voltage of the capacitor Ca is clamped at −Vfa by the forward voltage Vfa of the diode Da, the discharge current ILr of the reactor Lr starts to flow through the diode Da.

[Time T7]

While current is flowing through the diode Da, the switching element Q1 is turned on, and the switching element Q1 starts to flow the discharge current ILr to the drain terminal from the source terminal.

[Time T8]

When the release of the discharge energy of the reactor Lr is finished, the input voltage Vin is applied to the first winding L1. Thus, the voltage of Vin×(Ns/Np) is generated in the second winding L2, and the voltage of Vin×(Ns/Np) together with the voltage Vin of the capacitor C are applied to the primary winding TL1 of the transformer T. The above operation is repeated.

As described above, since the switching power-supply device 300 has an active clamp circuit AC, in the state where the voltage between the drain and source of the switching elements Q1, Q2 is in lowest, it is possible to perform a zero voltage switching for turning on them. Therefore, the voltage conversion with high efficiency can be achieved by reducing switching losses.

According to the switching power-supply device 300, since a loosely coupled one can be used as the transformer T, the inductance of the reactor Lr is increased, and a switching current waveform can be configured to have a gradient rather than a square wave. Since the switching current passes through the second winding L2, the discharge current of the reactor Lr can flow even in the first winding L1 which is magnetically coupled to the second winding L2. Therefore, the higher-order harmonics are attenuated in the input current Iin. Similarly, the output current Io also can attenuate the higher-order harmonics without becoming a square wave. Thus, the switching power-supply device 300 may be able to reduce the higher-order harmonics with respect to both the input and output, and to achieve a low noise performance.

According to the switching power-supply device 300, the magnetization energy (discharge current) of the reactor Lr after the switching element Q1 is turned off flows even in the first winding L1 and then is returned to the input side. Therefore, the capacitor C1 of the active clamp circuit AC is not charged only up to two times the input voltage Vin. Therefore, there is no need to increase the withstand voltage of the switching elements Q1, Q2, and it can prevent increase in the switching loss and increase in the conduction losses and the like thereby achieving high efficiency.

Figure 5:
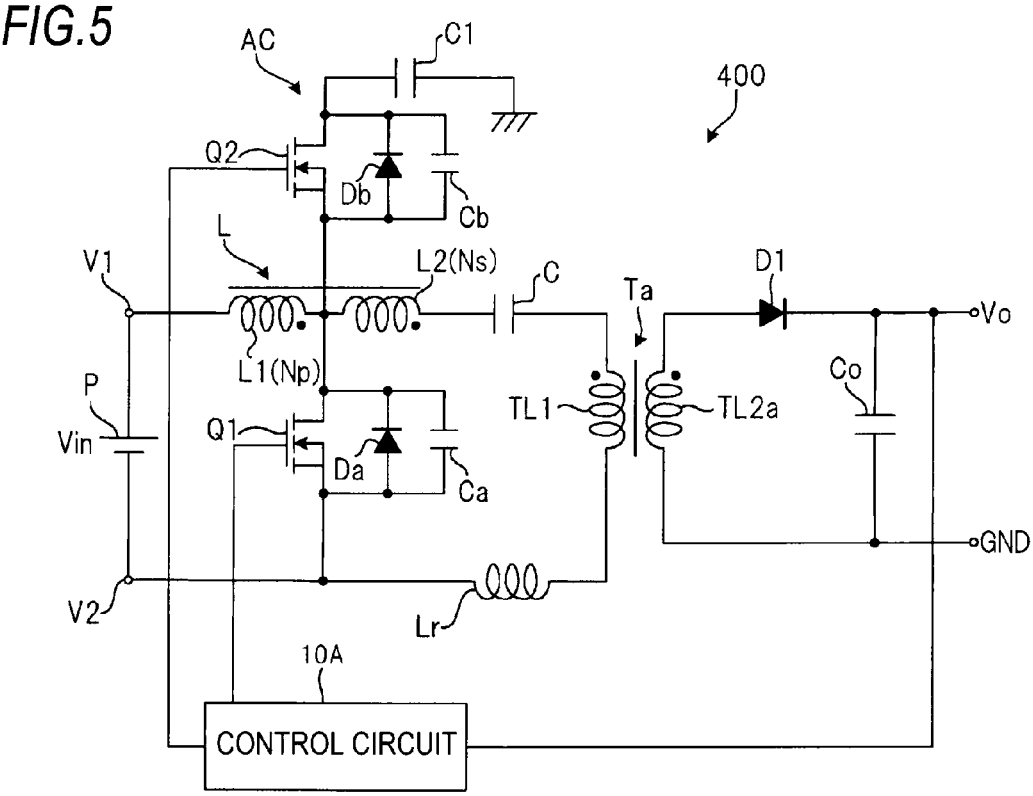
FIG. 5 is a circuit diagram illustrating a schematic configuration of a switching power-supply device 400 according to a modified embodiment of the switching power-supply device 100.

FIG. 5 is a circuit diagram illustrating a schematic configuration of a switching power-supply device 400 according to modified embodiment of the switching power-supply device 100.

The switching power-supply device 400 has the same configuration as the switching power-supply device 300 except that the diode D2 and the reactor Lo is removed, the cathode of the diode D1 is connected to the output terminal Vo and the transformer T is changed to the transformer Ta. The configuration of the output side of the switching power-supply device 400 is the same as that of the switching power-supply device 200 illustrated in FIG. 2. Even in the switching power-supply device 400, it is possible to obtain the same effect as in the switching power-supply device 300.

Incidentally, in the switching power-supply device 100 illustrated in FIG. 1, there may be provided a protective circuit for absorbing the discharge energy when the switching element Q1 is turned off and for protecting the switching element Q1 and the peripheral elements thereof.

Figure 6:
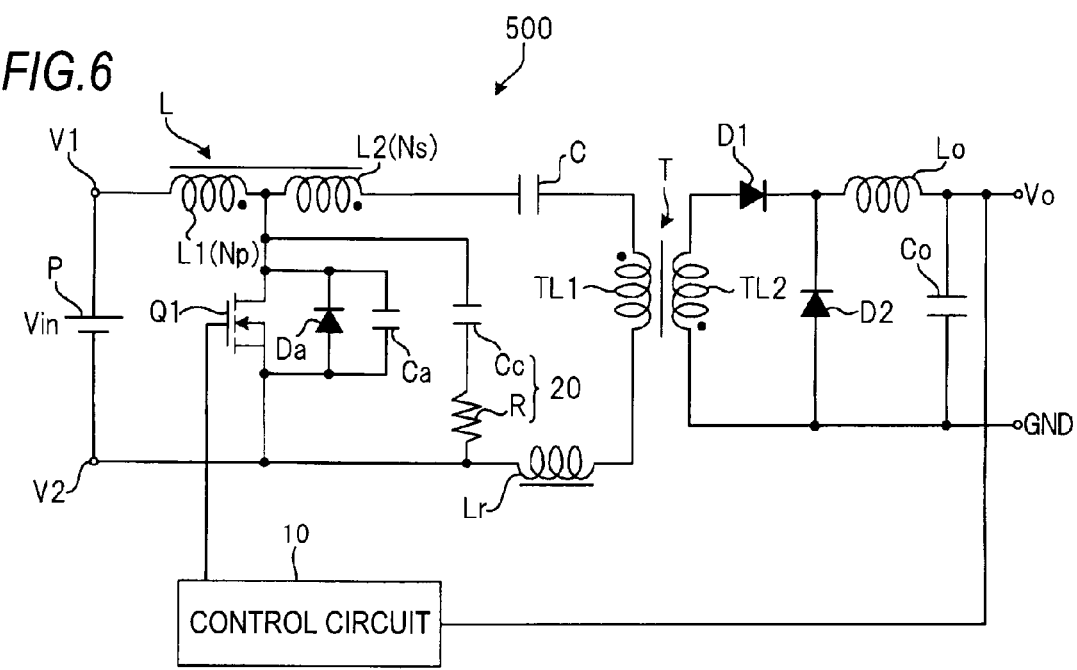
FIG. 6 is a circuit diagram illustrating a schematic configuration of a switching power-supply device 500 according to a modified embodiment of the switching power-supply device 100.

For example, like the switching power-supply device 500 illustrated in FIG. 6, the switching power-supply device 100 is provided with the protection circuit 20, which is a series circuit of a capacitor Cc and a resistor R and is connected in parallel to the switching element Q1, thereby increasing the reliability of the apparatus. The protection circuit 20 can also be applied to the switching power-supply device 200 illustrated in FIG. 2.

In addition, in the switching power-supply device 100 illustrated in FIG. 1, the secondary winding TL2 may have a center tap. In this case, the direction of the current flowing through the primary winding TL1 should be opposite to the direction of the current flowing through the secondary winding TL2. That is, the winding-start end of secondary winding TL2 is connected to the anode of diode D2, and the winding-finish end of the secondary winding TL2 is connected to the anode of the diode D2. Further, it may be configured to connect the cathode of the diode D1 and the cathode of the diode D2 to the output terminal Vo, and connect the center tap of the secondary winding TL2 to the ground terminal. The configuration having the secondary winding as the center tap may also be applied to the switching power-supply device 300 illustrated in FIG. 3 and the switching power-supply device 500 illustrated in FIG. 6.

Further, the reactor L of the switching power-supply devices 100 to 500 may not have a configuration in which the two separated windings as shown in figures are connected to each other. For example, it may be configured so that a lead wire is provided in the middle of one winding and the switching element Q1 is connected between the lead wire and the terminal V2. In this configuration, it is assumed that one side portion of the one winding becomes a first winding, and the other side portion of the one winding becomes a second winding, as the lead wire is viewed as a boundary line, and these are magnetically coupled.

As has been described above, the following configuration are disclosed herein.

The switching power-supply device of this disclosure includes: a first terminal configured to connect to one end of a DC power source; a first winding connected to the first terminal; a second winding, which is connected in series to the first winding and is magnetically coupled to the first winding; a first capacitor connected in series to the second winding; a transformer including a primary winding connected in series to the first capacitor and a secondary winding magnetically coupled to the primary winding; a rectifying-and-smoothing circuit connected to the secondary winding; a second terminal, which is configured to connect to the other end of the DC power source and is connected to an opposite end of the primary winding opposite to a connection end connecting to the first capacitor; a first switching element, which is connected between a connection point of the first winding and the second winding and the second terminal; and a control circuit, which controls first switching element to turn on-and-off.

The switching power-supply device of this disclosure may have a configuration where a ratio of the number of turns of the first winding and the number of turns of the second winding is in a range 1:1 to 1:4.

The switching power-supply device of this disclosure may have a configuration where the ratio of the number of turns of the first winding and the number of turns of the second winding is in a range 1:2 to 1:3.

The switching power-supply device of this disclosure may have a configuration where a series circuit, in which a second switching element and a second capacitor are provided in series, wherein the series circuit is connected in parallel to the first switching element, and wherein the control circuit controls one of the first switching element and the second switching element to turn off while the other one of the first switching element and the second switching element is turned on.

The switching power-supply device of this disclosure may have a configuration where the control circuit controls an output voltage by varying a ratio of an on-time of the first switching element and an on-time of a second switching element for a unit time.

This disclosure has been described above according to the detailed embodiments. However, the embodiments have been described merely as an example, it is not limited thereto. Changes may be made in these embodiments without departing from the scope and spirit of this disclosure.

Since the switching power-supply device of this disclosure can realize low-voltage input and high-power output, and high efficiency and low noise, it can be applied effectively to electronic equipment requiring a low safety-voltage and the reliability of an output voltage, such as medical measurement equipment and the like.

What is claimed is:

1. A switching power-supply device, comprising:
   a first terminal configured to connect to one end of a DC power source;
   a first winding connected to the first terminal;
   a second winding, which is connected in series to the first winding and is magnetically coupled to the first winding;
   a first capacitor connected in series to the second winding;
   a transformer including a primary winding connected in series to the first capacitor and a secondary winding magnetically coupled to the primary winding;
   a rectifying-and-smoothing circuit connected to the secondary winding for rectifying-and-smoothing a voltage generated in the secondary winding and outputting the voltage to an output terminal;
   a second terminal, which is configured to connect to another end of the DC power source and is connected to an opposite end of the primary winding opposite to a connection end connected to the first capacitor;
   a first switching element, which is connected between a connection point of the first winding and the second winding and the second terminal; and
   a control circuit, which receives the voltage from the output terminal and controls the first switching element to turn on-and-off,
   wherein while the first switching element is being turned off, the first capacitor is charged by a voltage of the DC power source, and while the first switching element is being turned on, a voltage of the first capacitor and a voltage caused in the second winding are applied to the primary winding.

2. The switching power-supply device according to claim 1, wherein a number of turns of the first winding is smaller than a number of turns of the second winding.

3. The switching power-supply device according to claim 1, further comprising:
   a series circuit, in which a second switching element and a second capacitor are provided in series, wherein the series circuit is connected in parallel to the first switching element, and
   wherein the control circuit controls one of the first switching element and the second switching element to turn off while the other one of the first switching element and the second switching element is turned on, and
   wherein the control circuit varies a ratio of a time of turning on the first switching element and a time of turning on the second switching element to control the voltage output from the output terminal.

* * * * *